US010923755B2

(12) United States Patent
Naito et al.

(10) Patent No.: US 10,923,755 B2
(45) Date of Patent: Feb. 16, 2021

(54) MOUNT STRUCTURE FOR FUEL CELL STACK

(71) Applicant: HONDA MOTOR CO., LTD., Tokyo (JP)

(72) Inventors: Hideharu Naito, Wako (JP); Yusuke Nara, Wako (JP); Hidetada Kojima, Wako (JP); Choichi Ishikawa, Wako (JP); Ryoichi Yoshitomi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 178 days.

(21) Appl. No.: 16/018,463

(22) Filed: Jun. 26, 2018

(65) Prior Publication Data

US 2018/0301733 A1 Oct. 18, 2018

Related U.S. Application Data

(63) Continuation-in-part of application No. 15/114,746, filed as application No. PCT/JP2015/051819 on Jan. 23, 2015, now Pat. No. 10,033,062.

(30) Foreign Application Priority Data

| Jan. 31, 2014 | (JP) | ................. | 2014-017706 |
| Feb. 4, 2014 | (JP) | ................. | 2014-018983 |
| Nov. 12, 2014 | (JP) | ................. | 2014-230024 |

(51) Int. Cl.
| *H01M 8/2475* | (2016.01) |
| *B60L 50/72* | (2019.01) |
| *B60L 50/71* | (2019.01) |
| *B60L 3/00* | (2019.01) |
| *H01M 8/2485* | (2016.01) |

(52) U.S. Cl.
CPC ......... *H01M 8/2475* (2013.01); *B60L 3/0007* (2013.01); *B60L 3/0053* (2013.01); *B60L 50/71* (2019.02); *B60L 50/72* (2019.02); *H01M 8/2485* (2013.01); *H01M 2250/20* (2013.01); *Y02E 60/50* (2013.01); *Y02T 10/70* (2013.01); *Y02T 90/40* (2013.01)

(58) Field of Classification Search
None
See application file for complete search history.

(56) References Cited

U.S. PATENT DOCUMENTS

| 6,479,180 B1 | 11/2002 | Uozumi |
| 7,964,318 B2 | 6/2011 | Suzuki et al. |
| 2002/0031697 A1 | 3/2002 | Sugita et al. |
| 2004/0065492 A1 | 4/2004 | Ogawa |

(Continued)

FOREIGN PATENT DOCUMENTS

| JP | 2001-030771 A | 2/2001 |
| JP | 2001-143742 A | 5/2001 |

(Continued)

*Primary Examiner* — Jonathan Crepeau
(74) *Attorney, Agent, or Firm* — Carrier Blackman & Associates, P.C.; William D. Blackman; Joseph P. Carrier

(57) ABSTRACT

A mount structure for a fuel cell stack includes a first bracket member supporting and fixing the fuel cell stack to a first installation member, and a second bracket member supporting and fixing the fuel cell stack to a second installation member. A part of the second bracket includes a constricted portion having low strength in comparison with other portions of the second bracket member.

5 Claims, 16 Drawing Sheets

(56) References Cited

U.S. PATENT DOCUMENTS

2011/0053033 A1     3/2011   Kobayashi et al.
2013/0230785 A1     9/2013   Terada et al.
2017/0117570 A1*   4/2017   Ishikawa ................. B60L 50/71

FOREIGN PATENT DOCUMENTS

| | | |
|---|---|---|
| JP | 2003-297377 A | 10/2003 |
| JP | 2004-063173 A | 2/2004 |
| JP | 2004-127787 A | 4/2004 |
| JP | 2006-040753 A | 2/2006 |
| JP | 2007-087760 A | 4/2007 |
| JP | 2007-317406 A | 12/2007 |
| JP | 4437640 B2 | 3/2010 |
| JP | 2012-035744 A | 2/2012 |
| JP | 2012-232743 A | 11/2012 |
| JP | 2013-152878 A | 8/2013 |
| JP | 2013-193724 A | 9/2013 |
| JP | 2014-101058 A | 6/2014 |

\* cited by examiner

MOUNT STRUCTURE FOR FUEL CELL STACK

CROSS-REFERENCE TO RELATED APPLICATIONS

The present application is a continuation-in-part of co-pending application Ser. No. 15/114,746, filed 27 Jul. 2016, which is a National Phase of International Application PCT/JP2015/051819, filed on Jan. 23, 2015, which claims priority from three Japanese Patent Applications JP 2014-017706, filed on Jan. 31, 2014, JP 2014-018983, filed on Feb. 4, 2014, and JP 2014-230024, filed on Nov. 12, 2014. The entire disclosure of each of the discussed prior applications is incorporated herein by reference.

TECHNICAL FIELD

The present invention relates to a mount structure for fixing a fuel cell stack to a predetermined installation position.

BACKGROUND ART

For example, a solid polymer electrolyte fuel cell employs a membrane electrode assembly (MEA) which includes an electrolyte membrane of a polymer ion exchange membrane, an anode provided on one side of the electrolyte membrane, and a cathode provided on the other side of the electrolyte membrane. The membrane electrode assembly is sandwiched between a pair of separators to form a power generation cell. In use, in the fuel cell, generally, a predetermined number of power generation cells are stacked together to form a fuel cell stack, e.g., mounted in a fuel cell vehicle (fuel cell electric vehicle, etc.).

In the fuel cell, a fuel gas flow field for supplying a fuel gas along the anode and an oxygen-containing gas flow field for supplying an oxygen-containing gas along the cathode are provided in the surfaces of the separators. Further, a coolant flow field for supplying a coolant is provided between the adjacent separators along surfaces of the adjacent separators.

In the fuel cell, so called internal manifold type fuel cell has been adopted. In the internal manifold type fuel cell, fuel gas passages, oxygen-containing gas passages, and coolant passages extend through the fuel cells in the stacking direction for allowing the fuel gas, the oxygen-containing gas, and the coolant to flow through the fuel cell. The fuel gas passages (reactant gas passages) are a fuel gas supply passage and a fuel gas discharge passage. The oxygen-containing gas passages (reactant gas passages) are an oxygen-containing gas supply passage and an oxygen-containing gas discharge passage. The coolant passages are a coolant supply passage and a coolant discharge passage. In the fuel cell, at least one of the end plates is equipped with a fluid manifold member connected to each passage for supplying or discharging fluid (fuel gas, oxygen-containing gas, or coolant).

In the above in-vehicle fuel cell stack, various types of mount structures for mounting the fuel cells in the vehicle have been proposed, in order to protect the fuel cells and attach the fuel cells to the vehicle. For example, an in-vehicle fuel cell disclosed in Japanese Laid-Open Patent Publication No. 2006-040753 and a fuel cell system for a movable body disclosed in Japanese Laid-Open Patent Publication 2004-127787 are known.

Further, in the in-vehicle fuel cell stack, it is necessary to suitably protect the fuel cells against external loads such as vibrations or impacts during traveling of the vehicle. For example, a fuel cell installation structure disclosed in Japanese Laid-Open Patent Publication No. 2007-317406 is known. In this fuel cell installation structure, a fuel cell stack formed by stacking a plurality of power generation cells is supported at an installation position using a cushioning device. The cushioning device has a conversion function for converting the direction of external force in a direction intersecting with the stacking direction of the power generation cells of the fuel cell stack into the stacking direction of the power generation cells.

In the structure, when an external force is applied to the fuel cell stack in a direction perpendicular to the stacking direction of the power generation cells, the direction of this external force is converted into the stacking direction of the power generation cells in which the durability against the external force is relatively high. According to the disclosure, by this structure, improvement of the vibration resistance and impact resistance is achieved.

SUMMARY OF INVENTION

The cushioning device has a link mechanism between the installation surface and each of both ends of the fuel cell stack, and thus, the entire installation structure has a considerably large size in the stacking direction of the fuel cell stack. Further, the structure is complicated, and uneconomical.

The present invention has been made to solve the problems of this type, and an object of the present invention is to provide a mount structure for a fuel cell stack having a simple and economical structure which makes it possible to suitably protect the fuel cell stack against an external load.

According to the first aspect of the present invention, there is provided a mount structure for fixing a fuel cell stack to a first installation member and a second installation member that are provided as separate members. The fuel cell stack includes a plurality of fuel cells for generating electrical energy by electrochemical reactions of a fuel gas and an oxygen-containing gas, the fuel cells being stacked together.

The mount structure includes a first bracket member configured to support the fuel cell stack and fix the fuel cell stack to the first installation member, and a second bracket member configured to support the fuel cell stack and fix the fuel cell stack to the second installation member. The second bracket member includes a constricted portion having low strength in comparison with other portions of the second bracket member.

In the first aspect of the present invention, the mount member is attached to one of the end plates, and has a function of fixing the fuel cell stack to the installation position, and a function of covering the fluid manifold member to thereby protect the fluid manifold member. Therefore, it is not required to use a dedicated mount structure for mounting the fuel cell stack and a dedicated protection structure for protecting the fluid manifold member. Further, the mount member is attached to the end plate, and thus the mount member can also have a function of reinforcing the strength of the end plate.

Accordingly, with the simple and economical structure, it becomes possible to suitably protect the fluid manifold member and reliably fix the fuel cell stack to the installation position.

Further, in the first aspect of the present invention, when an external load that is equal to or greater than a predetermined level is applied to the fuel cell stack, the constricted portion of the second bracket member is broken apart preferentially. Therefore, the fuel cell stack is not bound with both of the first installation member and the second installation member, which are provided as separate members. The fuel cell stack is separated from the second installation member, and the external load can be relieved reliably.

Accordingly, with the simple and economical structure, it becomes possible to suitably protect the fuel cell stack against the external load.

According to the second aspect of the present invention, there is provided a mount structure for fixing a fuel cell stack integrally to a first installation member and a second installation member that are provided as separate members. The fuel cell stack includes a plurality of fuel cells for generating electrical energy by electrochemical reactions of a fuel gas and an oxygen-containing gas, the fuel cells being stacked together. The mount structure includes a first bracket member configured to support the fuel cell stack and fix the fuel cell stack to the first installation member, and a second bracket member configured to support the fuel cell stack and fix the fuel cell stack to the second installation member. The second bracket member is fixed to a lower surface of the fuel cell stack by a plurality of bolts insertable through a plurality of bolt holes formed in the second bracket member. The second bracket member further includes a cutout portion arranged between the plurality of bolt holes adjacent to each other.

Further, in the second aspect of the present invention, when an external load that is equal to or greater than a predetermined level is applied to the fuel cell stack, the cutout portion formed at a part of the second bracket member is broken apart preferentially. Therefore, the fuel cell stack is not bound with both of the first installation member and the second installation member, which are provided as separate members. The fuel cell stack is separated from the second installation member, and the external load can be relieved reliably. Accordingly, with the simple and economical structure, it becomes possible to suitably protect the fuel cell stack against the external load.

DESCRIPTION OF EMBODIMENTS

Figure 1:
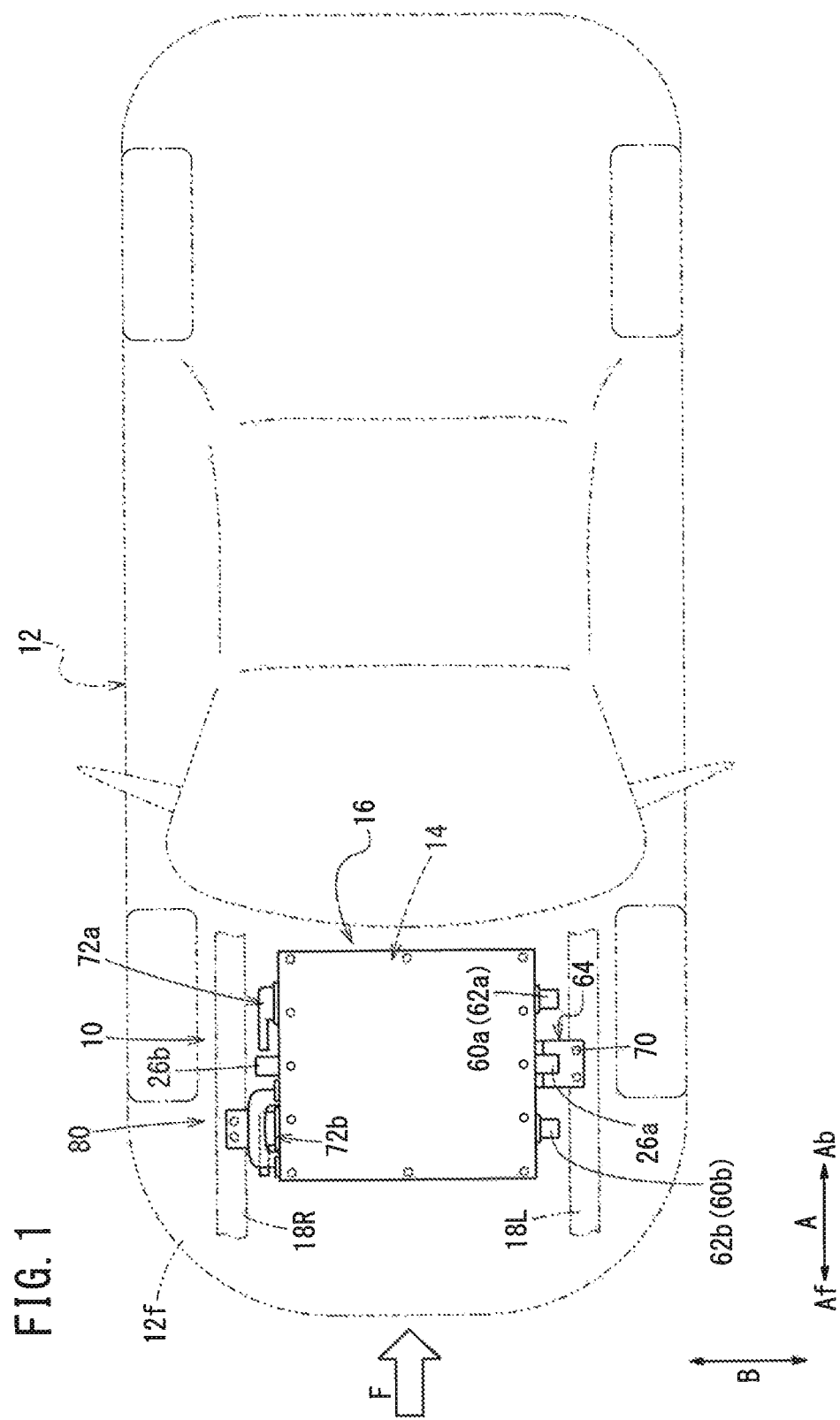
FIG. 1 is a plan view schematically showing a fuel cell electric vehicle equipped with a fuel cell stack.

As shown in FIG. 1, a fuel cell stack 10 is mounted in a front box (so called, motor room) 12f of a fuel cell electric vehicle (fuel cell vehicle) 12.

Figure 2:
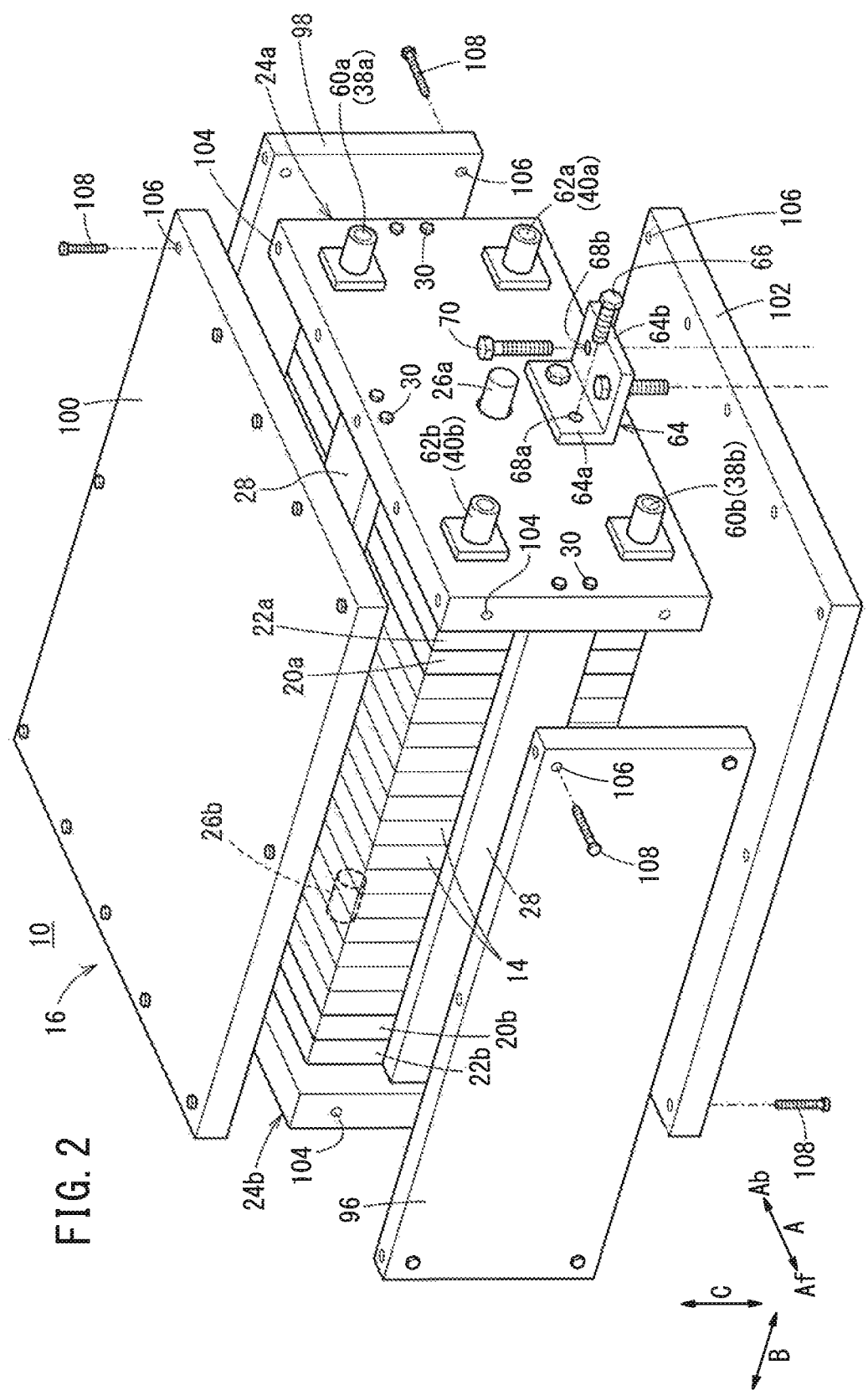
FIG. 2 is a partial exploded perspective view showing a casing containing the fuel cell stack.

The fuel cell stack 10 includes a plurality of stacked fuel cells 14, and a casing 16 containing the fuel cells 14 (see FIGS. 1 and 2). The casing 16 may be provided as necessary. Alternatively, the casing 16 may not be provided. As shown in FIG. 2, electrode surfaces of the fuel cells 14 are oriented upright, and the fuel cells 14 are stacked in a vehicle width direction of the fuel cell electric vehicle 12 indicated by an arrow B intersecting with a vehicle length direction (vehicle longitudinal direction) thereof indicated by an arrow A.

As shown in FIG. 1, in the front box 12f, first frame members (installation positions) 18R, 18L, which make up part of a vehicle body frame, extend in the direction indicated by the arrow A. The fuel cell stack 10 is mounted on the first frame members 18R, 18L. The fuel cell stack 10 may not be necessarily placed in the front box 12f. For example, the fuel cell stack 10 may be placed under the vehicle floor at the central portion of the vehicle, or adjacent to a rear trunk.

As shown in FIG. 2, at one end of the fuel cells 14 in the stacking direction, a first terminal plate 20a is provided. A first insulating plate 22a is provided outside the first terminal plate 20a, and a first end plate 24a is provided outside the first insulating plate 22a. At the other end of the fuel cells 14 in the stacking direction, a second terminal plate 20b is provided. A second insulating plate 22b is provided outside the second terminal plate 20b, and a second end plate 24b is provided outside the second insulating plate 22b.

A first power output terminal 26a extends outward from a substantially central position (or a position deviated from the central position) of the laterally elongated (rectangular) first end plate 24a. The first power output terminal 26a is connected to the first terminal plate 20a. A second power output terminal 26b extends outward from a substantially central position of the laterally elongated (rectangular) second end plate 24b. The second power output terminal 26b is connected to the second terminal plate 20b.

Coupling bars 28 each having a fixed length are provided between the first end plate 24a and the second end plate 24b at central positions of sides of the first end plate 24a and the second end plate 24b. Both ends of the coupling bars 28 are fixed respectively to the first end plate 24a and the second end plate 24b by screws 30 to apply a tightening load to the stacked fuel cells 14 in the stacking direction indicated by the arrow B.

Figure 3:
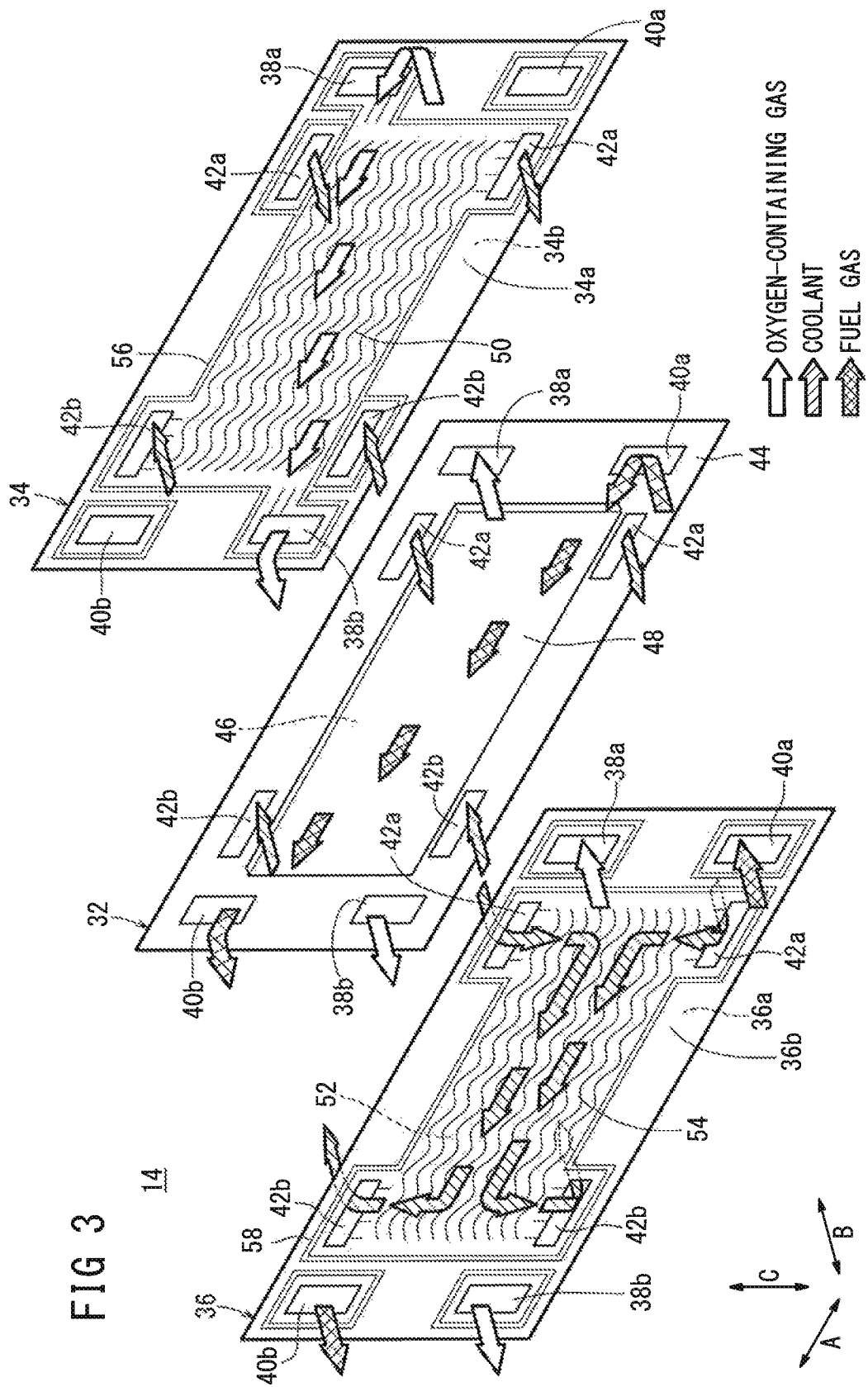
FIG. 3 is an exploded perspective view showing main components of a fuel cell of the fuel cell stack.

As shown in FIG. 3, the fuel cell 14 includes a membrane electrode assembly 32 and a first metal separator 34 and a second metal separator 36 sandwiching the membrane electrode assembly 32.

For example, the first metal separator 34 and the second metal separator 36 are metal plates such as steel plates, stainless steel plates, aluminum plates, plated steel sheets, or metal plates having anti-corrosive surfaces by surface treatment. The first metal separator 34 and the second metal separator 36 have rectangular planar surfaces, and are formed by corrugating metal thin plates by press forming to have a corrugated shape in cross section and a wavy or serpentine shape on the surface. Instead of the first metal separator 34 and the second metal separator 36, for example, carbon separators may be used.

The first metal separator 34 and the second metal separator 36 have a laterally elongated shape including long sides extending in a horizontal direction indicated by the arrow A and short sides extending in a gravity direction indicated by an arrow C. Alternatively, the short sides may extend in the horizontal direction and the long sides may extend in the gravity direction.

At one end of each of the fuel cells 14 in a long-side direction indicated by the arrow A, an oxygen-containing gas supply passage 38a and a fuel gas supply passage 40a are provided. The oxygen-containing gas supply passage 38a and the fuel gas supply passage 40a extend through the fuel cells 14 in the direction indicated by the arrow B. An oxygen-containing gas is supplied to the fuel cells 14 through the oxygen-containing gas supply passage 38a, and a fuel gas such as a hydrogen-containing gas is supplied to the fuel cells 14 through the fuel gas supply passage 40a.

At the other end of each of the fuel cells 14 in the long-side direction, a fuel gas discharge passage 40b and an oxygen-containing gas discharge passage 38b are provided. The fuel gas discharge passage 40b and the oxygen-containing gas discharge passage 38b extend through the fuel cells 14 in the direction indicated by the arrow B. The fuel gas is discharged from the fuel cells 14 through the fuel gas discharge passage 40b, and the oxygen-containing gas is discharged from the fuel cells 14 through the oxygen-containing gas discharge passage 38b.

At opposite end portions of the fuel cell 14 in the short-side direction indicated by the arrow C, two coolant supply passages 42a are provided on one side (i.e., on one end side in the horizontal direction), i.e., on a side closer to the oxygen-containing gas supply passage 38a and the fuel gas supply passage 40a. The two coolant supply passages 42a extend through the fuel cells 14 in the direction indicated by the arrow B in order to supply a coolant. The coolant supply passages 42a are provided respectively on upper and lower opposite sides. At opposite end portions of the fuel cell 14 in the short-side direction, two coolant discharge passages 42b are provided on the other side (i.e., on the other end side in the horizontal direction), i.e., on a side closer to the fuel gas discharge passage 40b and the oxygen-containing gas discharge passage 38b. The two coolant discharge passages 42b extend through the fuel cells 14 in the direction indicated by the arrow B in order to discharge the coolant. The coolant discharge passages 42b are provided respectively on upper and lower opposite sides.

The membrane electrode assembly 32 includes a cathode 46 and an anode 48, and a solid polymer electrolyte membrane 44 interposed between the cathode 46 and the anode 48. The solid polymer electrolyte membrane 44 is formed by impregnating a thin membrane of perfluorosulfonic acid with water, for example.

Each of the cathode 46 and the anode 48 has a gas diffusion layer (not shown) such as a carbon paper or the like, and an electrode catalyst layer (not shown) of platinum alloy supported on porous carbon particles. The carbon particles are deposited uniformly on the surface of the gas diffusion layer. The electrode catalyst layer of the cathode 46 and the electrode catalyst layer of the anode 48 are formed on both surfaces of the solid polymer electrolyte membrane 44, respectively.

The first metal separator 34 has an oxygen-containing gas flow field 50 on its surface 34a facing the membrane electrode assembly 32. The oxygen-containing gas flow field 50 is connected to the oxygen-containing gas supply passage 38a and the oxygen-containing gas discharge passage 38b. The oxygen-containing gas flow field 50 includes a plurality of wavy flow grooves (or straight flow grooves) extending in the direction indicated by the arrow A.

The second metal separator 36 has a fuel gas flow field 52 on its surface 36a facing the membrane electrode assembly 32. The fuel gas flow field 52 is connected to the fuel gas supply passage 40a and the fuel gas discharge passage 40b. The fuel gas flow field 52 includes a plurality of wavy flow grooves (or straight flow grooves) extending in the direction indicated by the arrow A.

A coolant flow field 54 is formed between the adjacent first and second metal separators 34, 36, i.e., between a surface 36b of the second metal separator 36 and a surface 34b of the first metal separator 34. The coolant flow field 54 is connected to the coolant supply passages 42a and the coolant discharge passages 42b. The coolant flow field 54 extends in the horizontal direction, and in the coolant flow field 54, the coolant flows over the electrode area of the membrane electrode assembly 32.

A first seal member 56 is formed integrally with the surfaces 34a, 34b of the first metal separator 34, around the outer circumferential end of the first metal separator 34. A second seal member 58 is formed integrally with the surfaces 36a, 36b of the second metal separator 36, around the outer circumferential end of the second metal separator 36.

Each of the first seal member 56 and the second seal member 58 is an elastic seal member which is made of seal material, cushion material, packing material, or the like, such as an EPDM, an NBR, a fluoro rubber, a silicone rubber, a fluorosilicone rubber, a butyl rubber, a natural rubber, a styrene rubber, a chloroprene rubber, an acrylic rubber, or the like.

As shown in FIG. 2, an oxygen-containing gas supply manifold member 60a, an oxygen-containing gas discharge manifold member 60b, a fuel gas supply manifold member 62a, and a fuel gas discharge manifold member 62b are connected to the first end plate 24a. The oxygen-containing gas supply manifold member 60a is connected to the oxygen-containing gas supply passage 38a, the oxygen-containing gas discharge manifold member 60b is connected to the oxygen-containing gas discharge passage 38b, the fuel gas supply manifold member 62a is connected to the fuel gas supply passage 40a, and the fuel gas discharge manifold member 62b is connected to the fuel gas discharge passage 40b.

As shown in FIGS. 1 and 2, a mount member 64 is placed on the first end plate 24a. The mount member 64 fixes the fuel cell stack 10 to the first frame member 18L. The mount member 64 is a bent plate member having an L-shape in cross section. A plurality of holes 68a are formed in a vertical surface 64a of the mount member 64. The mount member 64 is fixed to a lower central portion of the first end plate 24a by screws 66 being inserted into the holes 68a. A plurality of holes 68b are formed in a horizontal surface 64b of the mount member 64. Screws 70 are inserted through the holes 68b, and screwed into screw holes (not shown) of the first frame member 18L.

Figure 4:
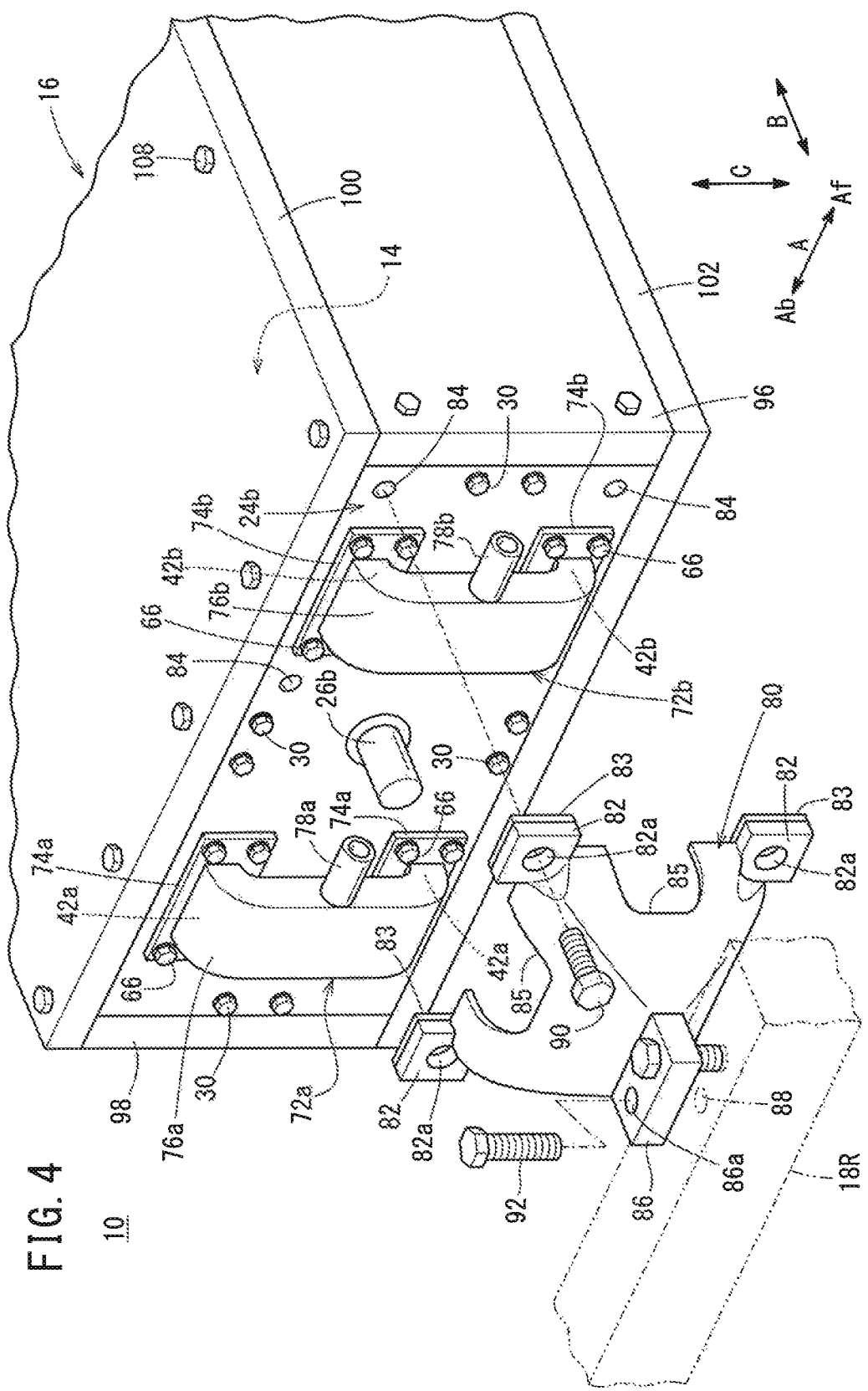
FIG. 4 is a partial exploded perspective view showing a coolant manifold member of the fuel cell stack.

As shown in FIG. 4, a coolant supply manifold member (fluid manifold member) (coolant manifold member) 72a made of resin is attached to the second end plate 24b. The coolant supply manifold member 72a is connected to the pair of coolant supply passages 42a. A coolant discharge manifold member (fluid manifold member) (coolant manifold member) 72b made of resin is attached to the second end plate 24b. The coolant discharge manifold member 72b is connected to the pair of coolant discharge passages 42b.

The coolant supply manifold member 72a has upper and lower flanges 74a connected respectively to the upper and lower coolant supply passages 42a. The flanges 74a are formed integrally with a supply main body part 76a. An inlet pipe 78a is connected to an intermediate position of the supply main body part 76a. The flanges 74a are fixed to the second end plate 24b by screws 66, respectively.

The coolant discharge manifold member 72b has upper and lower flanges 74b connected to the upper and lower coolant discharge passages 42b. The flanges 74b are formed integrally with a discharge main body part 76b. An outlet pipe 78b is connected to an intermediate position of the discharge main body part 76b. The flanges 74b are fixed to the second end plate 24b by screws 66, respectively.

A mount member 80 is placed on the second end plate 24b. The mount member 80 fixes the fuel cell stack 10 to the first frame member 18R, and covers the coolant discharge manifold member 72b. The mount member 80 has a cubic shape. The bottom of the mount member 80 facing the second end plate 24b has a substantially rectangular shape.

A plurality of, e.g., three (or four), attachment portions 82 are provided at the bottom of the mount member 80. Each of the attachment portions 82 has a flat surface in parallel to the plate (flat) surface of the second end plate 24b. The attachment portions 82 have respective holes 82a extending in a horizontal direction, and the second end plate 24b has screw holes 84 corresponding to the holes 82a. The screw holes 84 are provided at upper and lower positions on an end of the second end plate 24b that is closer to the coolant discharge manifold member 72b, and provided at an upper position on an inner side relative to the coolant discharge manifold member 72b on the second end plate 24b. Plates (or intermediate members) 83 may be interposed between the attachment portions 82 and the second end plate 24b. It should be noted that the plates (or intermediate members) 83 may be used for all of the attachment portions in second and subsequent embodiments described later.

A recess 85 is formed between the attachment portions 82, in correspondence with the shape of the coolant discharge manifold member 72b, e.g., in correspondence with the shape of the outlet pipe 78b. The recess 85 is provided as a cutout of the mount member 80 in order to avoid interference with the outlet pipe 78b. Additionally, various types of recess 85 may be provided between the attachment portions 82 in correspondence with the shape of the coolant discharge manifold member 72b, e.g., in correspondence with the discharge main body part 76b, if necessary.

A rectangular fixing portion 86 is provided at an end of the mount member 80 opposite to the bottom of the mount member 80 (opposite to the end where the attachment portions 82 are present). A plurality of holes 86a are formed in the fixing portion 86 along the vertical direction. A plurality of screw holes 88 are formed in the first frame member 18R in correspondence with the holes 86a.

Screws 90 are inserted through the holes 82a, and screwed into the screw holes 84 of the second end plate 24b to thereby attach the mount member 80 to the second end plate 24b. Screws 92 are inserted through the holes 86a, and screwed into the screw holes 88 of the first frame member 18R to thereby fix the mount member 80 to the first frame member 18R.

As shown in FIG. 2, two sides (two faces) at both ends of the casing 16 in the vehicle width direction indicated by the arrow B are the first end plate 24a and the second end plate 24b. Two sides (two faces) at both ends of the casing 16 in the vehicle length direction indicated by the arrow A are a front side panel 96 and a rear side panel 98. The front side panel 96 and the rear side panel 98 are laterally elongated plates. Two sides (two faces) at both ends of the casing 16 in the vehicle height direction indicated by the arrow C are an upper side panel 100 and a lower side panel 102. The upper side panel 100 and the lower side panel 102 are laterally elongated plates.

The front side panel 96, the rear side panel 98, the upper side panel 100, and the lower side panel 102 are fixed to the first end plate 24a and the second end plate 24b using screws 108 screwed through holes 106 into screw holes 104 formed on sides of the first end plate 24a and the second end plate 24b.

Hereinafter, operation of the fuel cell stack 10 will be described below.

Firstly, as shown in FIG. 2, an oxygen-containing gas is supplied from the oxygen-containing gas supply manifold member 60a at the first end plate 24a to the oxygen-containing gas supply passage 38a. A fuel gas such as a hydrogen-containing gas is supplied from the fuel gas supply manifold member 62a at the first end plate 24a to the fuel gas supply passage 40a.

Further, as shown in FIG. 4, a coolant such as pure water, ethylene glycol, oil, or the like is supplied from the coolant supply manifold member 72a at the second end plate 24b to the pair of coolant supply passages 42a.

Thus, as shown in FIG. 3, the oxygen-containing gas flows from the oxygen-containing gas supply passage 38a into the oxygen-containing gas flow field 50 of the first metal separator 34. The oxygen-containing gas flows along the oxygen-containing gas flow field 50 in the direction indicated by the arrow A, and the oxygen-containing gas is supplied to the cathode 46 of the membrane electrode assembly 32 for inducing an electrochemical reaction at the cathode 46.

In the meanwhile, the fuel gas is supplied from the fuel gas supply passage 40a to the fuel gas flow field 52 of the second metal separator 36. The fuel gas moves along the fuel gas flow field 52 in the direction indicated by the arrow A, and the fuel gas is supplied to the anode 48 of the membrane electrode assembly 32 for inducing an electrochemical reaction at the anode 48.

Thus, in the membrane electrode assembly 32, the oxygen-containing gas supplied to the cathode 46 and the fuel gas supplied to the anode 48 are consumed in the electrochemical reactions at catalyst layers of the cathode 46 and the anode 48 for generating electricity.

Then, the oxygen-containing gas consumed at the cathode 46 of the membrane electrode assembly 32 is discharged along the oxygen-containing gas discharge passage 38b in the direction indicated by the arrow B. In the meanwhile, the fuel gas consumed at the anode 48 of the membrane electrode assembly 32 is discharged along the fuel gas discharge passage 40b in the direction indicated by the arrow B.

Further, the coolant supplied to the pair of coolant supply passages 42a flows into the coolant flow field 54 between the first metal separator 34 and the second metal separator 36. The coolant temporarily flows inward in the direction indicated by the arrow C, and then, the coolant moves in the direction indicated by the arrow A for cooling the membrane electrode assembly 32. After the coolant moves outward in the direction in the direction indicated by the arrow C, the coolant is discharged along the pair of coolant discharge passages 42b in the direction indicated by the arrow B.

As described above, in the fuel cell electric vehicle 12, electrical energy from the fuel cell stack 10 is supplied to a traction motor (not shown) for allowing traveling of the fuel cell electric vehicle 12. At this time, as shown in FIG. 1, when an external load F as an impact is applied from the front side to the fuel cell electric vehicle 12 backward in the vehicle length direction indicated by the arrow Ab, the front portion of the fuel cell electric vehicle 12 tends to be deformed inward easily. Therefore, in particular, the coolant discharge manifold member 72b which is positioned in front of the coolant supply manifold member 72a tends to be damaged easily, and liquid junction in the fuel cell stack 10 may occur undesirably.

As shown in FIGS. 1 and 4, the mount member 80 is attached to the second end plate 24b. The mount member 80 fixes the fuel cell stack 10 to the first frame member 18R, and covers the coolant discharge manifold member 72b. That is, the mount member 80 has a function of fixing the fuel cell stack 10 to the first frame member 18R and a function of protecting the coolant discharge manifold member 72b.

Therefore, it is not required to use a dedicated mount structure for mounting the fuel cell stack 10 and a dedicated protection structure for protecting the coolant discharge manifold member 72b. Further, since the mount member 80 is attached to the second end plate 24b, the mount member 80 has a function of reinforcing the strength of the second end plate 24b. In the structure, reduction in the thickness of the second end plate 24b can be achieved easily.

Accordingly, with the simple and economical structure, it becomes possible to protect the coolant discharge manifold member 72b suitably, and reliably fix the fuel cell stack 10 to the first frame member 18R, which is an installation position of the fuel cell stack 10, advantageously.

The mount member 80 is attached to the second end plate 24b in a manner to cover the coolant discharge manifold member 72b. However, the present invention is not limited in this respect. For example, in addition to the mount member 80 covering the coolant discharge manifold member 72b, a mount member (not shown) covering the coolant supply manifold member 72a may be provided. Further, instead of the mount member 64, a mount member covering a desired manifold member may be attached to the first end plate 24a as well.

Figure 5:
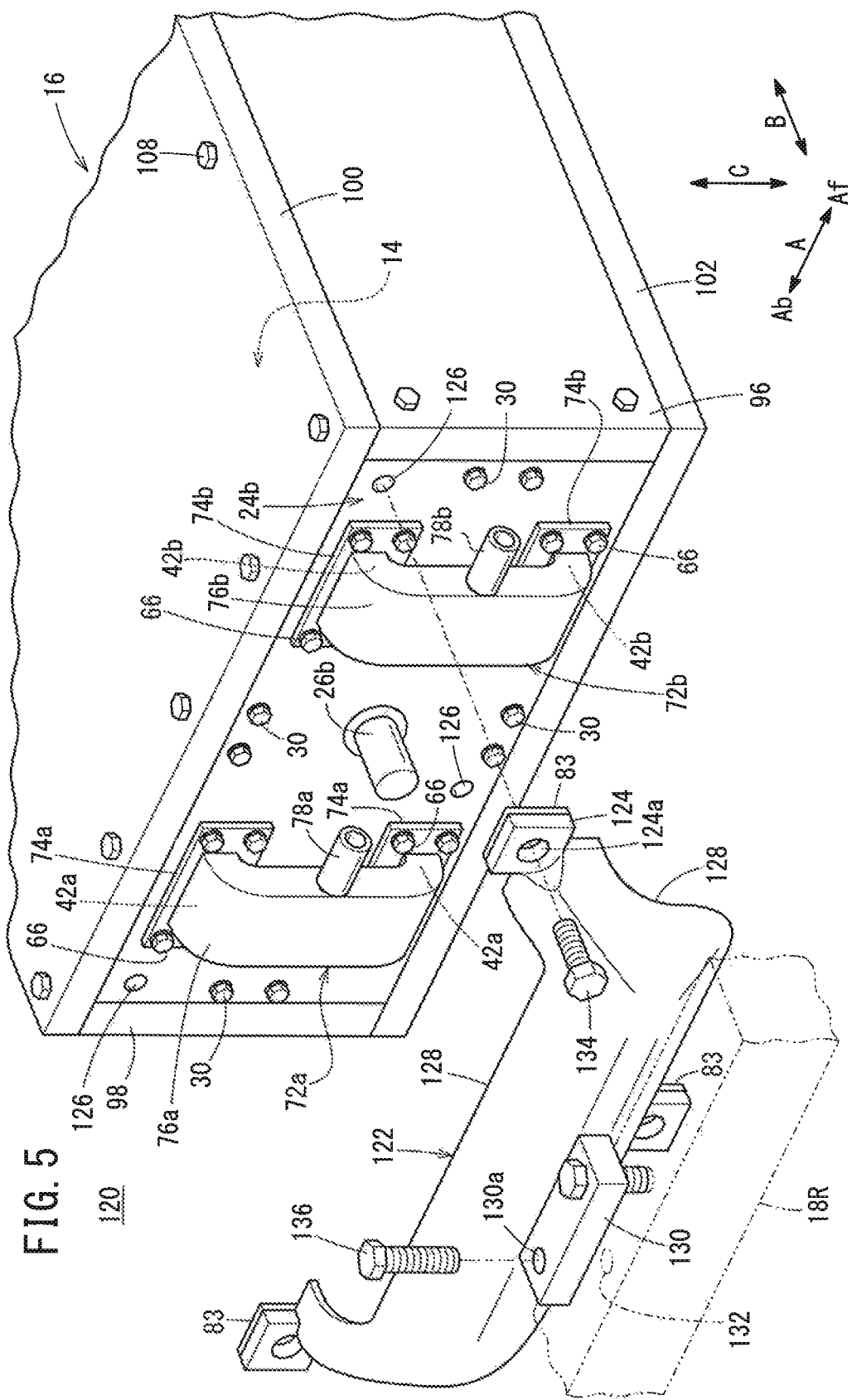
FIG. 5 is a partial exploded perspective view showing another fuel cell stack.

FIG. 5 is a partial exploded perspective view showing a fuel cell stack 120. The constituent elements of the fuel cell stack 120 that are identical to those of the fuel cell stack 10 are labeled with the same reference numerals, and detailed description thereof is omitted. Also in embodiments described later, the constituent elements that are identical to those of the fuel cell stack 10 according to the first embodiment are labeled with the same reference numerals, and detailed description thereof is omitted.

Figure 6:
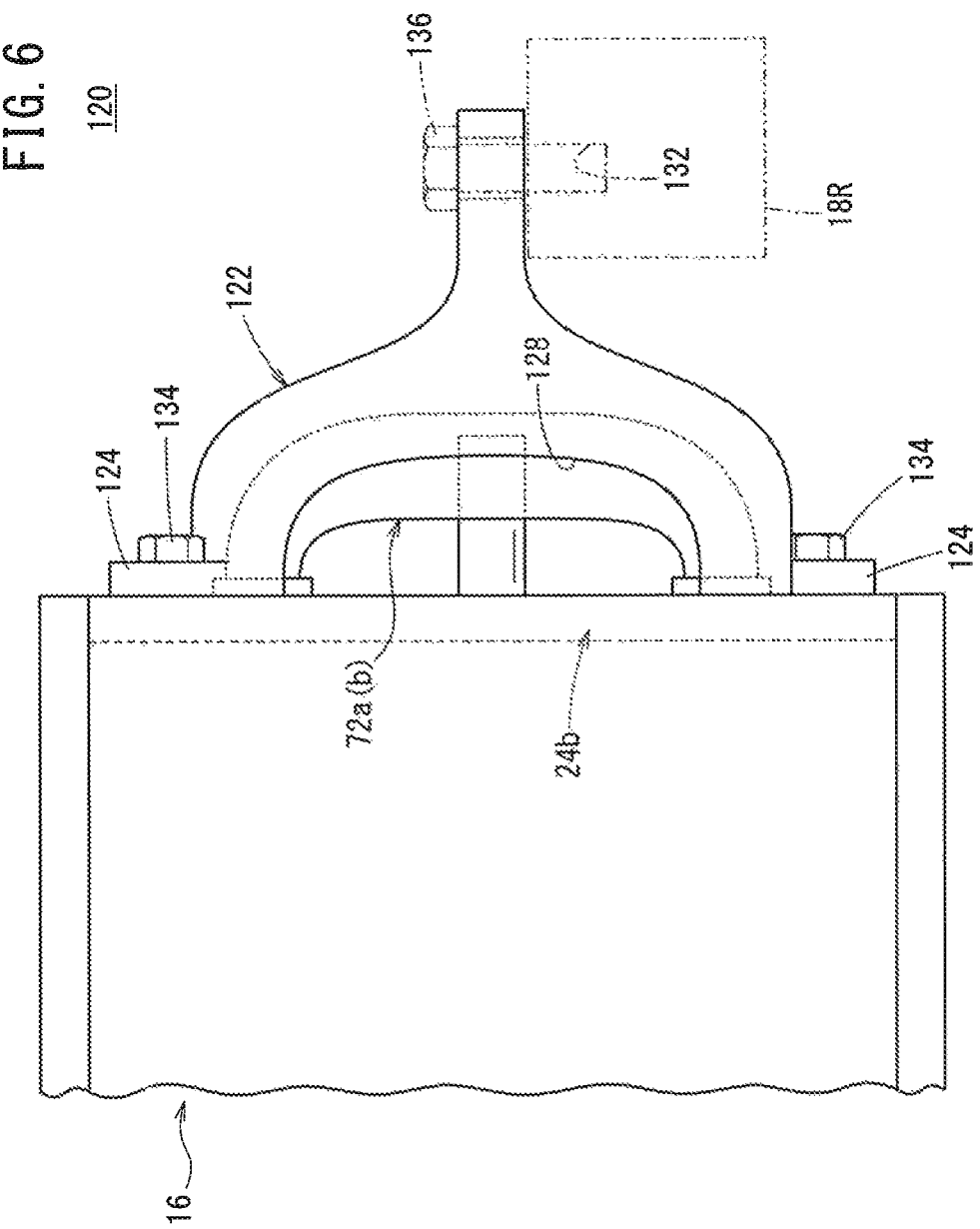
FIG. 6 is a side view showing a coolant manifold member of the fuel cell stack.

As shown in FIGS. 5 and 6, the fuel cell stack 120 has a mount member 122 attached to the second end plate 24b. The mount member 122 fixes the fuel cell stack 120 to the first frame member 18R, and covers both of the coolant supply manifold member 72a and the coolant discharge manifold member 72b altogether. The mount member 122 has a cubic shape, and the bottom of the mount member 122 facing the second end plate 24b has a substantially triangular shape (or substantially rectangular shape).

A plurality of, e.g., three (or four), attachment portions 124 are provided at the bottom of the mount member 122. Each of the attachment portions 124 has a flat surface in parallel to the plate (flat) surface of the second end plate 24b. The attachment portions 124 have respective holes 124a extending in a horizontal direction, and the second end plate 24b has screw holes 126 corresponding to the holes 124a. The screw holes 126 are provided at both of upper corners and at a lower central position of the second end plate 24b, outside the coolant supply manifold member 72a and the coolant discharge manifold member 72b.

A recess 128 is formed between the attachment portions 124, in correspondence with the shapes of the coolant supply manifold member 72a and the coolant discharge manifold member 72b. The recess 128 is provided as a cutout of the mount member 122 in order to avoid interference with the other parts.

A rectangular fixing portion 130 is provided at an end of the mount member 122 opposite to the bottom of the mount member 122. A plurality of holes 130a are formed in the fixing portion 130. The holes 130a extend in the vertical direction. A plurality of screw holes 132 are formed in the first frame member 18R in correspondence with the holes 130a. Screws 134 are inserted through the holes 124a, and screwed into the screw holes 126 of the second end plate 24b to thereby attach the mount member 122 to the second end plate 24b. Screws 136 are inserted through the holes 130a, and screwed into the screw holes 132 of the first frame member 18R to thereby fix the mount member 122 to the first frame member 18R.

In the mount structure, the mount member 122 has a function of fixing the fuel cell stack 120 to the first frame member 18R and a function of protecting both of the coolant supply manifold member 72a and the coolant discharge manifold member 72b together. Accordingly, with the simple and economical structure, the coolant supply manifold member 72a and the coolant discharge manifold member 72b are protected suitably. Further, it becomes possible to reliably fix the fuel cell stack 120 to the first frame member 18R.

Although the second embodiment has been described only with regard to the second end plate 24b, the first end plate 24a may have the same structure as the second end plate 24b.

Figure 7:
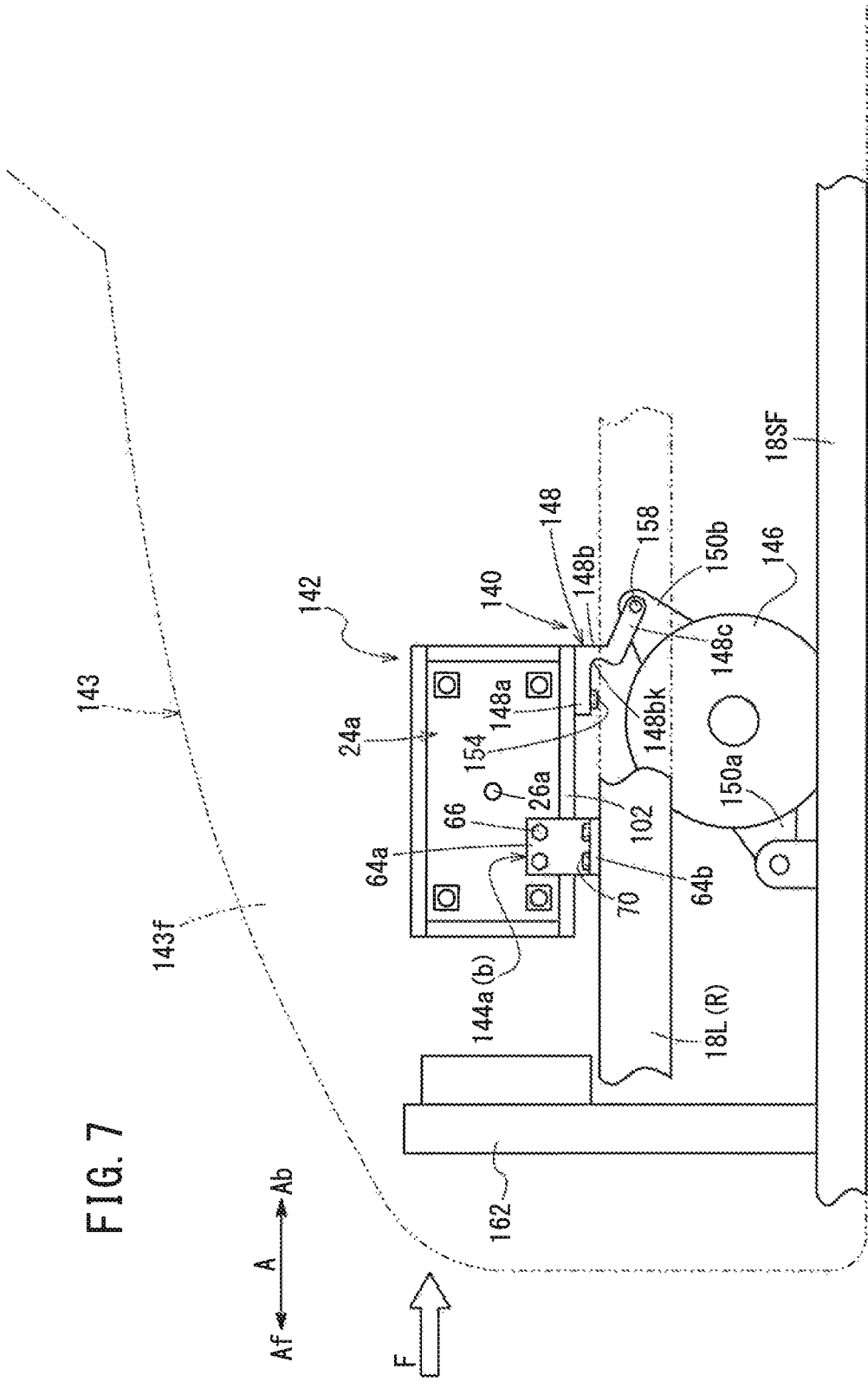
FIG. 7 is a side view schematically showing a front side of a fuel cell electric vehicle equipped with a fuel cell stack to which a mount structure according to an embodiment of the present invention is applied.
Figure 8:
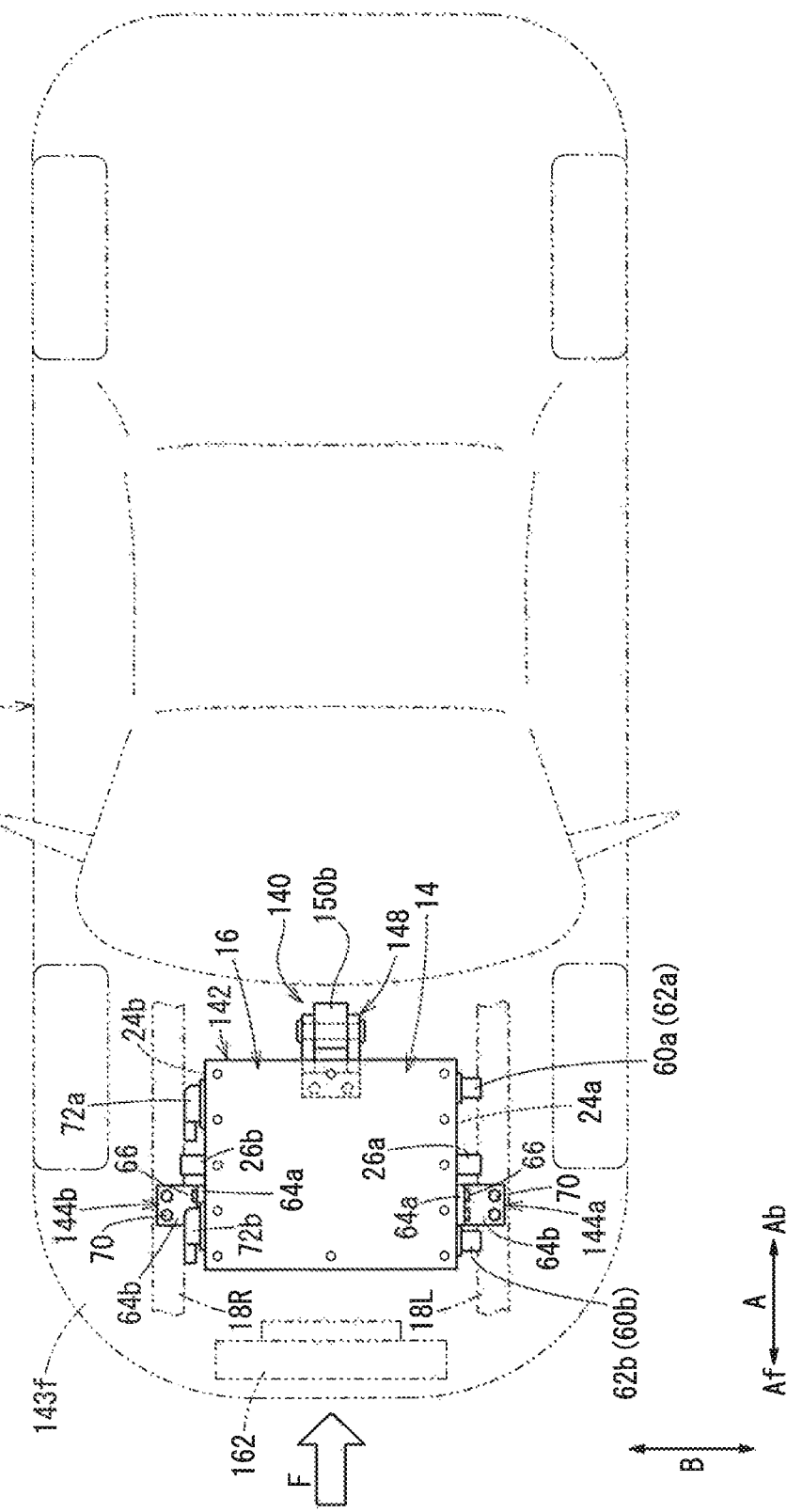
FIG. 8 is a plan view schematically showing the fuel cell electric vehicle.

As shown in FIGS. 7 and 8, a mount structure 140 according to an embodiment of the present invention is applied to a fuel cell stack 142. The fuel cell stack 142 is mounted in a front box 143f of a fuel cell electric vehicle 143.

The mount structure 140 includes first bracket members 144a, 144b. The first bracket members 144a, 144b support the fuel cell stack 142, and are fixed to first frame members (first installation members) 18L, 18R. The first bracket members 144a, 144b have the same structure as the mount member 64.

As shown in FIG. 7, the mount structure 140 includes a second bracket member 148. In a state where the second bracket member 148 supports the fuel cell stack 142, the second bracket member 148 is fixed to a second frame member (second installation member) 18SF of the vehicle frame through a traction motor 146. The traction motor 146 can be driven by electrical energy generated by the fuel cell stack 142, and the traction motor 146 is fixed to the second frame member 18SF through a first motor bracket 150a by using screws. A second motor bracket 150b is attached to the traction motor 146, and the second motor bracket 150b is connected to the second bracket member 148.

Figure 9:
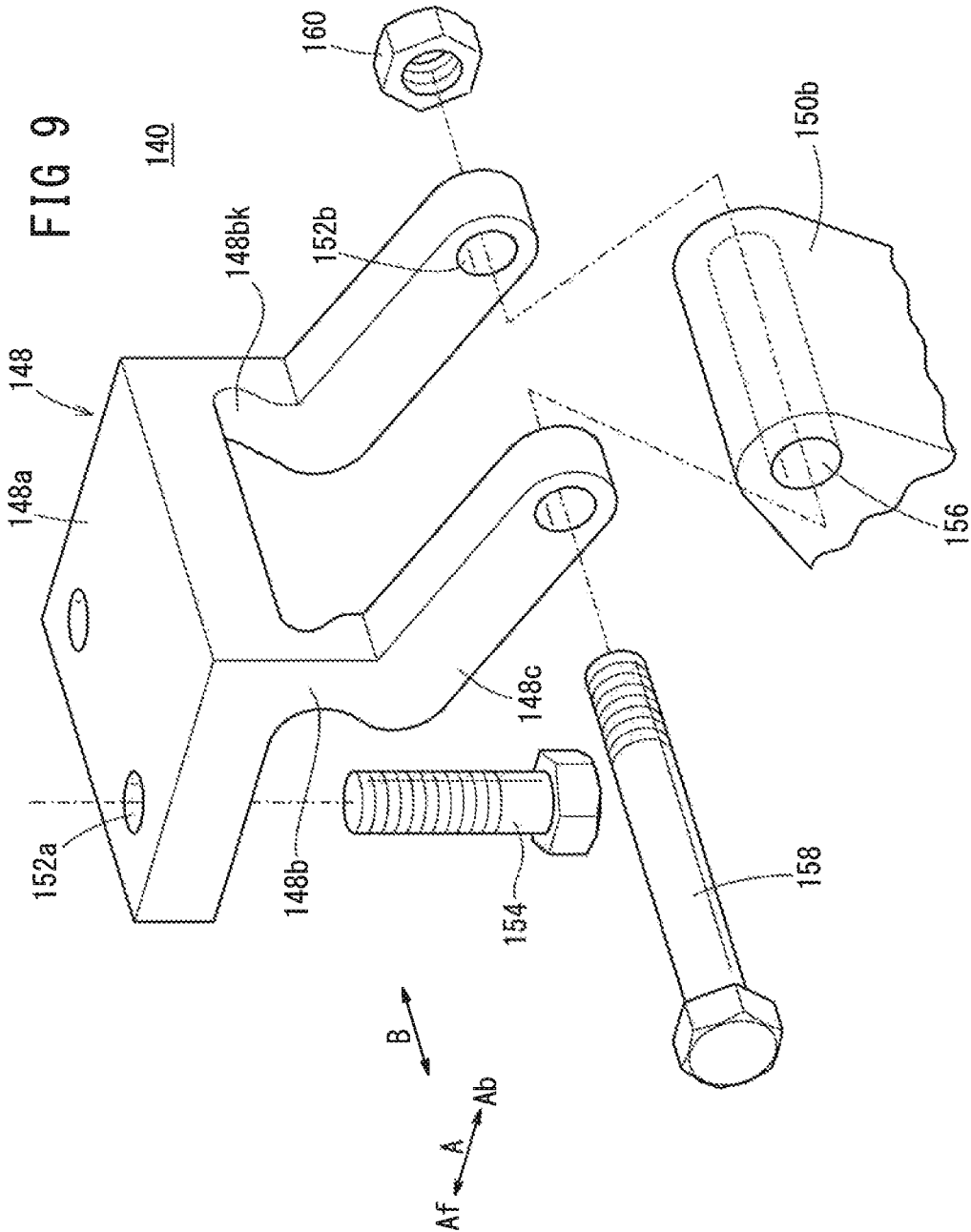
FIG. 9 is a perspective view showing a second bracket member of the mount structure.

As shown in FIGS. 7 to 9, the second bracket member 148 includes a flat portion 148a coupled to a bottom portion of the fuel cell stack 142, more specifically, a substantially central portion of the lower side panel 102 in the direction indicated by the arrow B. As shown in FIG. 9, a plurality of, e.g., two, holes 152a are formed in the flat portion 148a. Screws 154 are inserted through the holes 152a, and screwed into screw holes (not shown) of the lower side panel 102 to thereby fix the second bracket member 148 to the lower side panel 102. The number of holes 152a is not limited to two, and can be determined depending on the required joining strength.

A pair of support portions 148b extend downward from the flat portion 148a, and each of the support portions 148b is constricted in a horizontal direction to form a constricted portion 148bk. The thickness of the constricted portion 148bk is reduced in the horizontal direction, and the strength of the constricted portion 148bk is weakened only against the force applied backward in the horizontal direction indicated by the arrow Ab. The strength of the constricted portion 148bk in the horizontal direction (shearing direction) is low in comparison with the other portions of the second bracket member 148. The position of the constricted portion 148bk is not limited to the third embodiment. As long as the thickness in the horizontal direction can be reduced, the constricted portion 148bk may be provided at any position.

That is, the constricted portion 148bk is configured to have a low section modulus in the longitudinal direction of the vehicle. Further, the constricted portion 148bk may be configured to have a low section modulus in the lateral direction of the vehicle. By adopting the configuration, if an impact is applied to the vehicle from the lateral side, the second bracket member 148 can be broken at the constricted portion 148bk suitably.

Legs 148c extend from lower ends of the support portions 148b, respectively. The legs 148c are inclined downward from the horizontal direction, and holes 152b extending in the horizontal direction are formed in terminal end portions of the legs 148c, respectively. The second motor bracket 150b is disposed between the legs 148c. A hole 156 is formed in the second motor bracket 150b. A shaft 158 is inserted through the holes 152b of the legs 148c and the hole 156, and a threaded portion at the front end of the shaft 158 is screwed into a nut 160. The second bracket member 148 and the second motor bracket 150b are fixed together.

As shown in FIG. 7, a fuel cell cooling radiator 162 is provided on the second frame member 18SF. The fuel cell stack 142 is provided adjacent to the backside of the radiator 162.

Operation of the fuel cell stack 142 will be described below.

Electrical energy generated by the fuel cell stack 142 is supplied to the traction motor 146 for allowing traveling of the fuel cell electric vehicle 143. At this time, as shown in FIG. 7, when an external load F as an impact is applied from the front side to the fuel cell electric vehicle 143 backward in the vehicle length direction indicated by the arrow Ab, the front portion of the fuel cell electric vehicle 143 tends to be deformed inward easily.

Figure 10:
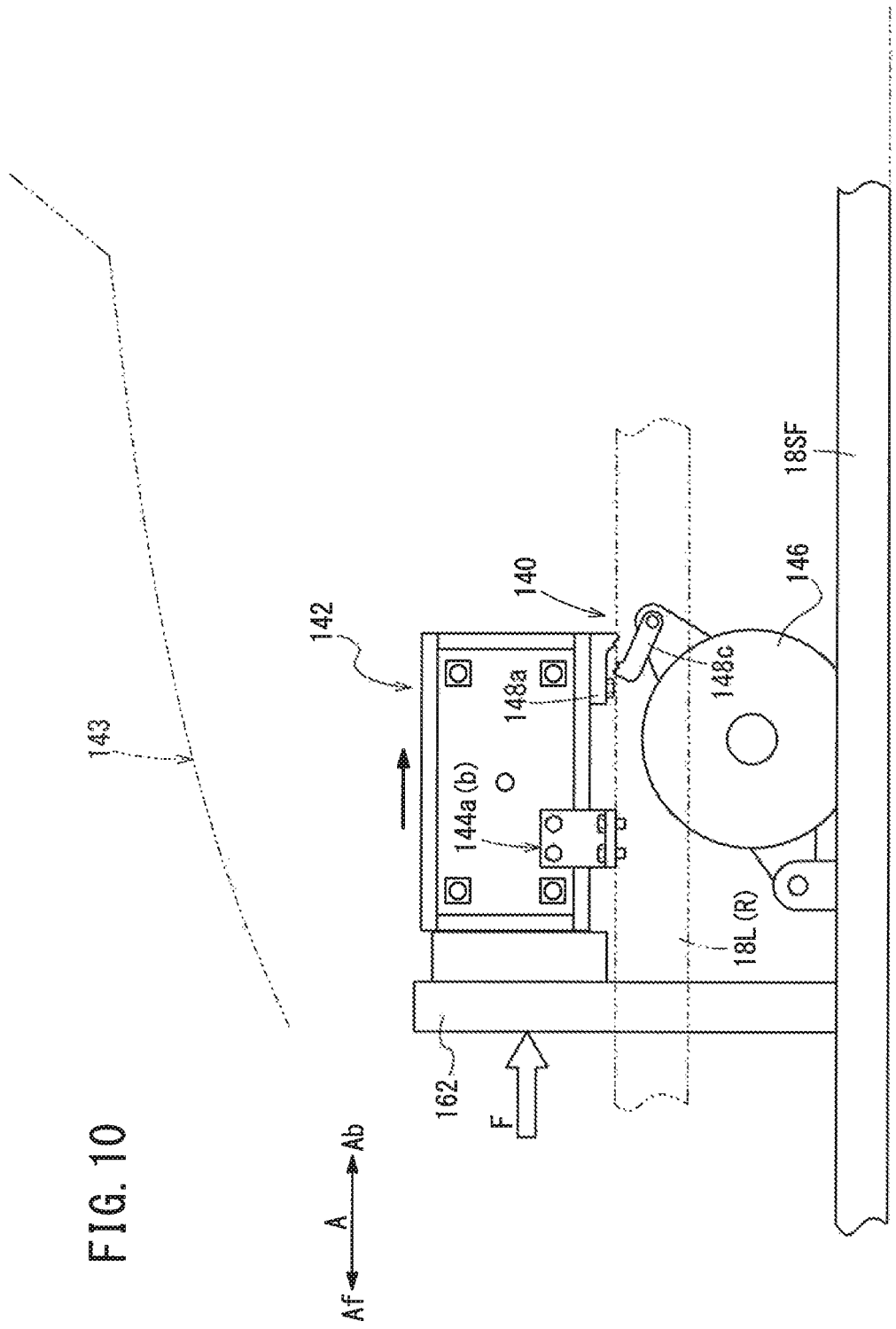
FIG. 10 is a view showing a state where the second bracket member is broken due to application of an external load to the fuel cell electric vehicle.

Therefore, as shown in FIG. 10, the radiator 162 moves backward in the direction indicated by the arrow Ab, and abuts against the fuel cell stack 142. Therefore, a load is applied backward to the fuel cell stack 142. In this regard, by the mount structure 140, the fuel cell stack 142 is fixed to the first frame members 18R, 18L and the second frame member 18SF, which are provided as separate members.

In the present embodiment, the second bracket member 148 of the mount structure 140 includes the constricted portion 148bk having low strength in comparison with the other portions (see FIG. 9). More specially, a pair of support portions 148b extend downward from the flat portion 148a, and each of the support portions 148b is constricted in the horizontal direction to form the constricted portion 148bk. The strength of the constricted portion 148bk is weakened only against the force applied backward in the horizontal direction indicated by the arrow Ab. The strength of the constricted portion 148bk in the horizontal direction (shearing direction) is low in comparison with the other portions of the second bracket member 148.

Therefore, when an external load F that is equal to or greater than a predetermined level is applied to the fuel cell stack 142 in the horizontal direction, the constricted portion 148bk of the second bracket member 148 is broken apart preferentially. Therefore, the fuel cell stack 142 is not bound with all of the first frame members 18L, 18R and the second frame member 18SF, which are provided as separate members. The fuel cell stack 142 is separated from the second frame member 18SF (see FIG. 10).

That is, the fuel cell stack 142 is supported only by the first frame members 18L, 18R through the first bracket members 144a, 144b. In the structure, it is possible to reliably relieve the external load F without being affected by deformation of the second frame member 18SF. Thus, in the third embodiment, with the simple and economical structure, it becomes possible to suitably protect the fuel cell stack 142 against the external load F.

Figure 11:
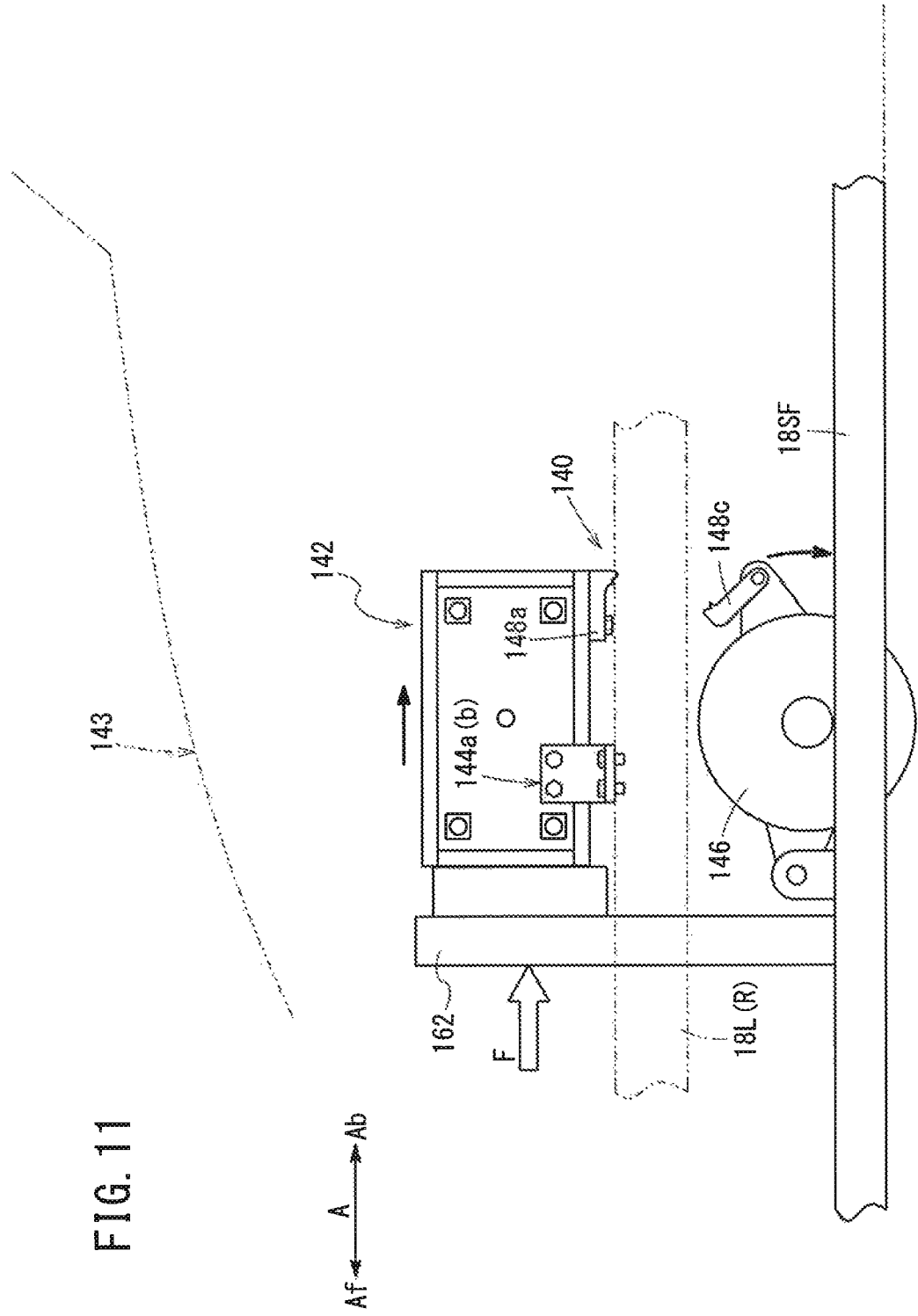
FIG. 11 is a view showing a state where the fuel cell stack has moved further backward.

Further, in the present embodiment, the traction motor 146 is separated from the fuel cell stack 142. Therefore, as shown in FIG. 11, the traction motor 146 can move below the first frame members 18L, 18R. In the structure, it becomes possible to suitably suppress entry of the traction motor 146 into, for example, an area around the braking pedal (not shown).

Figure 12:
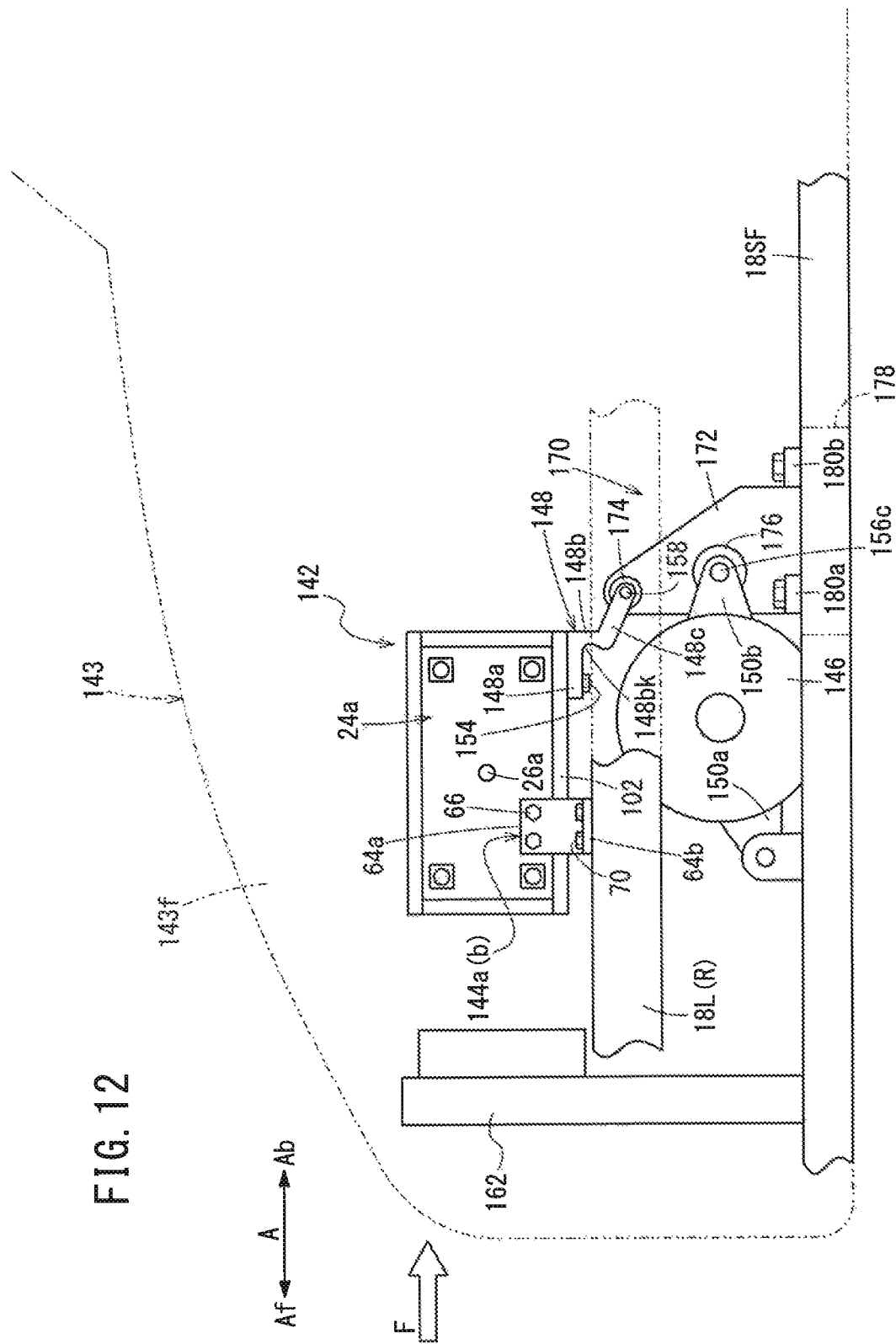
FIG. 12 is a side view schematically showing a front side of a fuel cell electric vehicle equipped with a fuel cell stack to which a mount structure according to another embodiment of the present invention is applied.
Figure 13:
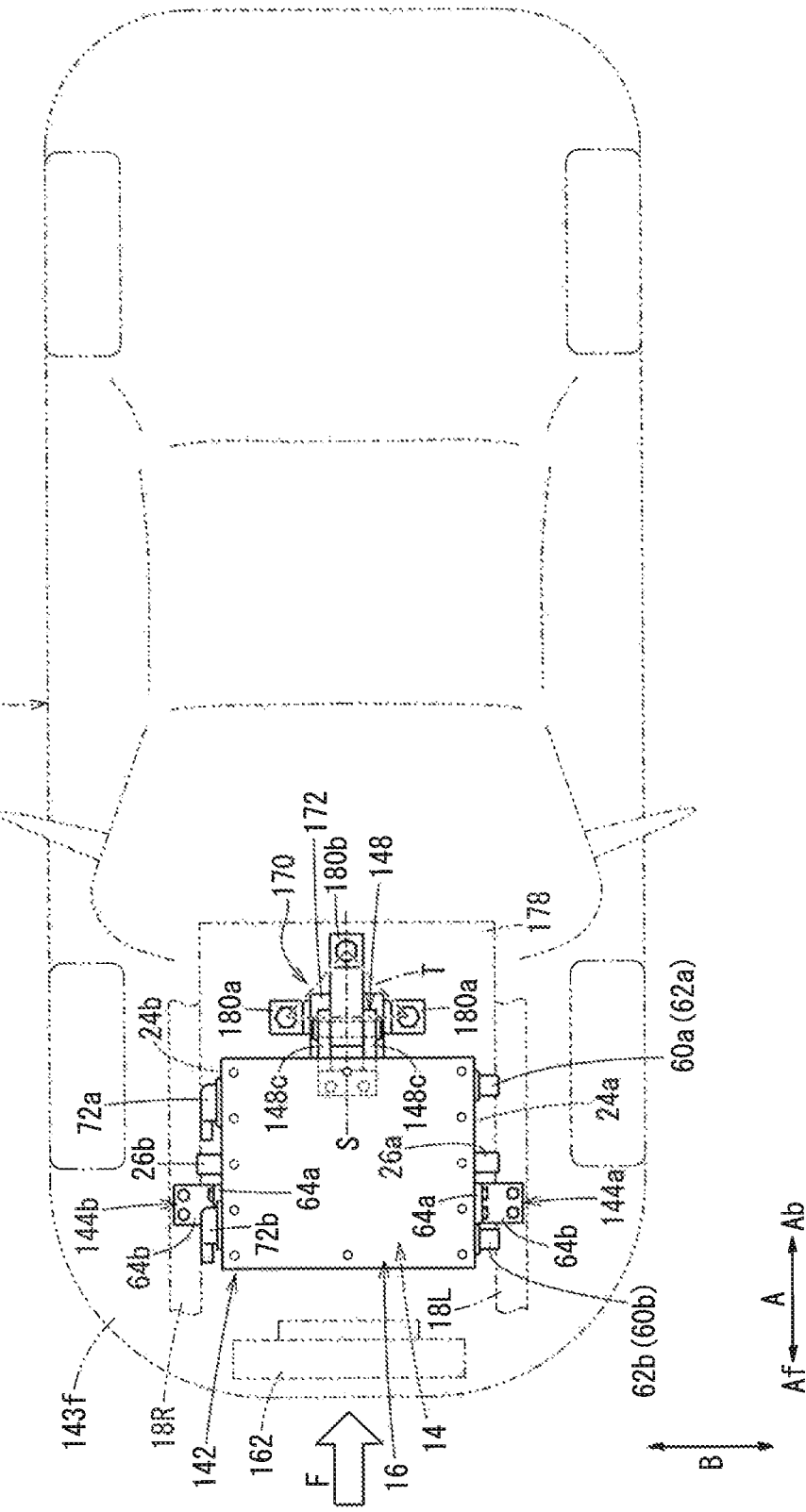
FIG. 13 is a plan view schematically showing the fuel cell electric vehicle.

As shown in FIGS. 12 and 13, a mount structure 170 according to another embodiment of the present invention is applied to a fuel cell stack 142. The constituent elements that are identical to those of the mount structure 140 are labeled with the same reference numerals, and detailed description thereof is omitted.

The mount structure 170 includes a motor mount 172 for fixing the rear side of the traction motor 146 to the second frame member 18SF. The motor mount 172 includes a fuel cell fixing part 174 and a motor fixing part 176, which are disposed respectively at upper and lower positions thereof. Further, the motor mount 172 includes attachment portions 180a, 180b, which are provided below the motor fixing part 176. The attachment portions 180a, 180b are fixed to a cross frame 178 using screws.

As shown in FIG. 13, a pair of the attachment portions 180a are provided on the left and right sides. The attachment portion 180b is provided on an imaginary line S passing between the pair of attachment portions 180a in the width direction indicated by the arrow B. The pair of attachment portions 180*a* and the attachment portion 180*b* are arranged at positions corresponding to the corners of a triangular shape T in a plan view. The cross frame 178 is fixed to a pair of the second frame members 18SF.

As shown in FIG. 12, a pair of legs 148*c* are fixed to the fuel cell fixing part 174 through rubber members (not shown) by use of screws, to thereby fix the second bracket member 148 to the motor mount 172. The second motor bracket 150*b* attached to the traction motor 146 is fixed to the motor fixing part 176 using a tightening pin 156*c*.

The second bracket member 148 of the mount structure 170 has a constricted portion 148*bk* having a lower strength in comparison with the other portions. Thus, with the simple and economical structure, the same advantages as in the case of the mount structure 140 are obtained. For example, it becomes possible to suitably protect the fuel cell stack 142 against the external load F.

Figure 14:
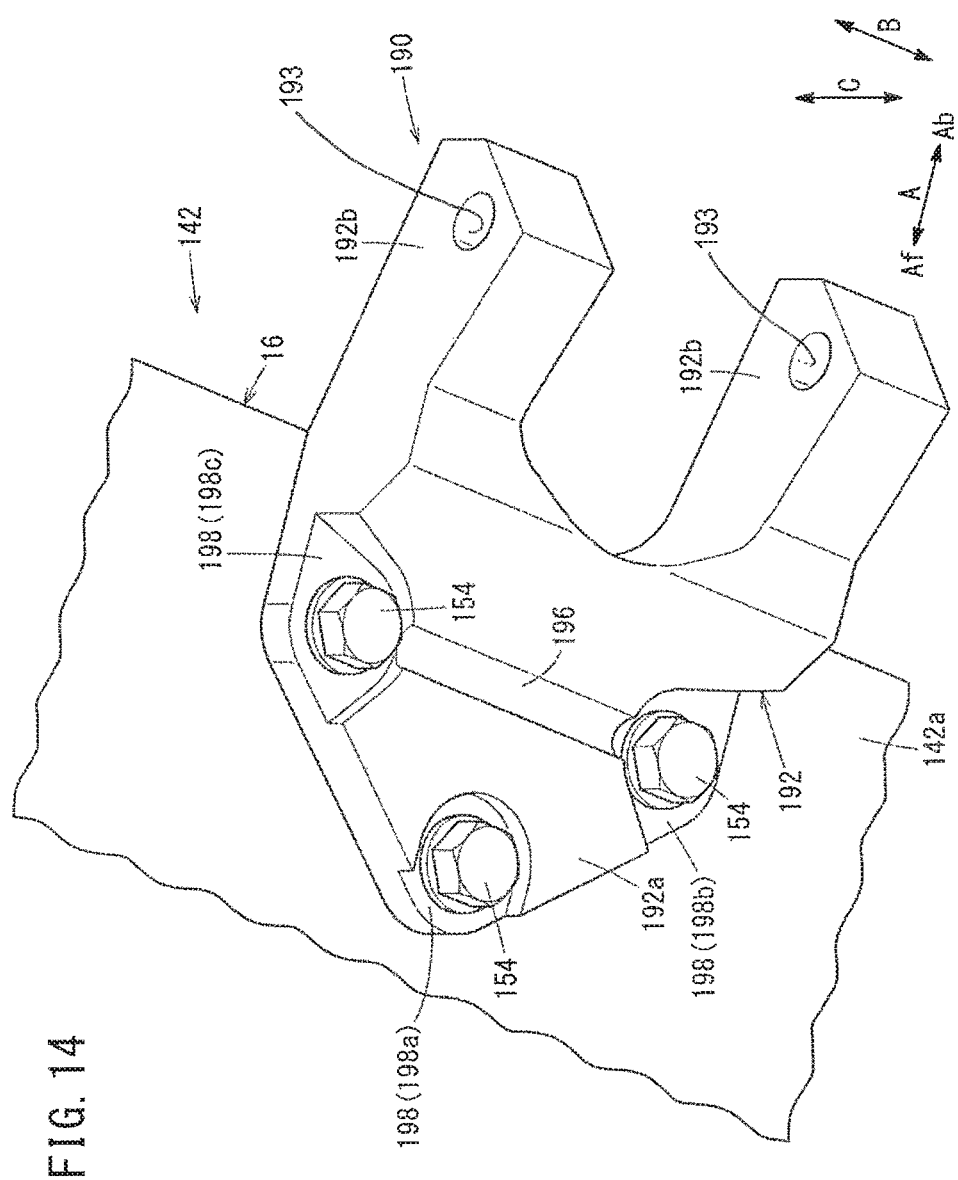
FIG. 14 is a perspective view from below showing a fuel cell stack to which a mount structure according to yet another embodiment of the present invention is applied.

As shown in FIG. 14, a second bracket member 192 of a mount structure 190 according to yet another embodiment is fixed to a lower surface 142*a* (a lower surface of the casing 16) of a fuel cell stack 142 by a plurality of bolts 154. The mount structure 190 is equipped with first bracket members 114*a*, 144*b*, as in the mount structures 140, 170 (see, for example, FIG. 7).

Figure 15:
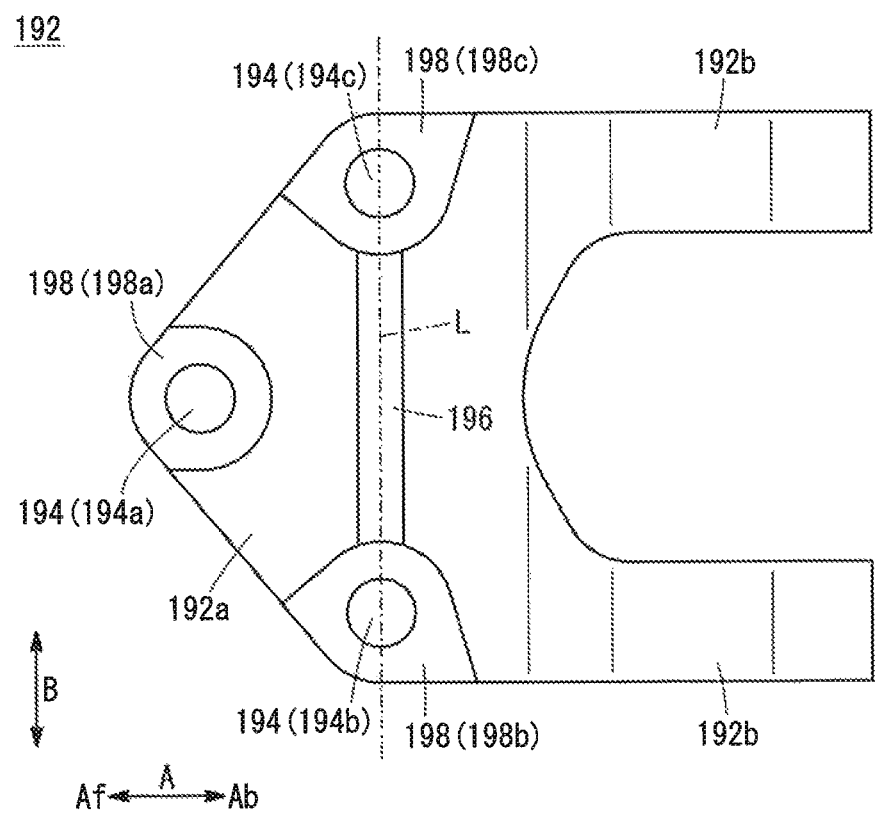
FIG. 15 is a plan view showing a second bracket member of the mount structure shown in FIG. 14.

As shown in FIG. 15, the second bracket member 192 has a plurality (three in the illustration) of bolt holes 194 through which the plurality of bolts are inserted, and a cutout portion 196 arranged between the plurality of bolt holes 194 adjacent to each other.

The second bracket member 192 includes a plate portion 192*a* overlaid on and fixed to the lower surface 142*a* (the lower surface of the casing 16) of the fuel cell stack 142. The plate portion 192*a* forms a base of the second bracket member 192 and fastened to the lower surface of the fuel cell stack 142 by the bolts 154. The plurality of bolt holes 194 and the cutout portion 196 are formed in the plate portion 192*a*.

As shown in FIGS. 14 and 15, the second bracket member 192 further includes a pair of legs 192*b* extending downward parallel to each other from the plate portion 192*a* to the rear side of the vehicle (in the direction of arrow Ab). Each of the legs 192*b* has a hole 193 formed respectively therein for receiving a shaft portion of a bolt therethrough, where the holes 193 are coaxial and aligned with one another, and in this way, the second bracket member 192 is configured to be attached to a second motor bracket 150*b* of the traction motor 146. The pair of legs 192*b* is separated from and opposed to each other horizontally (in the direction of arrow B). The second motor bracket 150*b* is disposed between the pair of legs 192*b* (see FIG. 7). The pair of legs 192*b* are fixed to the second motor bracket 150*b* by bolts 154 and nuts 160 (see FIG. 9).

As shown in FIG. 15, three bolt holes 194 are arranged at respective vertices of an isosceles triangle. Two bolt holes 194*b*, 194*c* formed at positions corresponding to respective ends of the base of the isosceles triangle are separated from each other in the horizontal direction (the direction of arrow B). The other bolt hole 194*a* is formed closer to the front side of the vehicle than the two bolt holes 194*b*, 194*c* described above.

In the plate portion 192*a*, (thin-walled) depressions 198 (depressions 198*a* to 198*c*) recessed from the other part of the plate portion 192*a* are formed around the bolt holes 194. The depressions 198 are provided in the plate portion 192*a* on a surface opposite to the surface facing the lower surface 142*a* of the fuel cell stack 142. The depressions 198 are configured such that a thickness of the plate portion 192*a* at the depressions is less than a thickness of the plate portion at other parts thereof.

The cutout portion 196 has a groove structure. The cutout portion 196 has lower strength in comparison with other portions of the second bracket member 192. The cutout portion 196 is formed, for example, by machining (cutting). In this case, it is possible to set a fracture load bearing by adjusting the extent of machining. The cutout portion 196 may be formed by forging, molding, or the like.

The cutout portion 196 extends straight along the (horizontal) direction (the direction of arrow B) in which the plurality of bolt holes 194 adjacent to each other are separated. Specifically, the cutout portion 196 is arranged between two bolt holes 194*b*, 194*c* positioned at the respective ends of the base of the isosceles triangle.

As viewed from the thickness direction (the direction of arrow C) of the plate portion 192*a*, the cutout portion 196 is arranged along the straight line L connecting the centers of the bolt holes 194 adjacent to each other. One end of the cutout portion 196 communicates with the depression 198*b* surrounding the bolt hole 194*b*. The other end of the cutout portion 196 communicates with the depression 198*c* surrounding the bolt hole 194*c*.

In FIG. 14, the cutout portion 196 is formed at the position corresponding to the base of the isosceles triangle. The cutout portion 196 is provided in the second bracket member 192 (the plate portion 192*a*) on a surface opposite to the surface facing the lower surface 142*a* of the fuel cell stack 142. The cutout portion 196 is recessed toward the lower surface 142*a* of the fuel cell stack 142. The cutout portion 196 may be provided in the second bracket member 192 (the plate portion 192*a*) on the surface facing the lower surface 142*a* of the fuel cell stack 142.

According to the mount structure 190, the cutout portion 196 formed at a part of the second bracket member 192 is broken apart preferentially, when an external load that is equal to or greater than a predetermined level is applied to the fuel cell stack 142. Therefore, the fuel cell stack 142 is not bound integrally with the first installation member (first frame members 18R, 18L) and the second installation member (second frame member 18FS), which are provided as separate members. The fuel cell stack can be separated from the second installation member, and the external load can be relieved reliably. Accordingly, with the simple and economical structure, it becomes possible to suitably protect the fuel cell stack 142 against the external load.

Figure 16A:
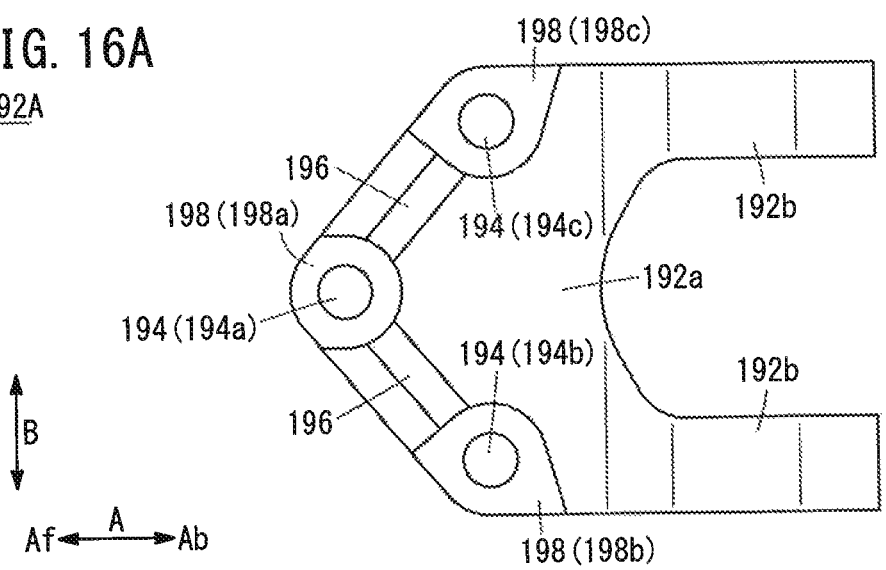
FIG. 16A is a view showing a first modification of the second bracket member.
Figure 16B:
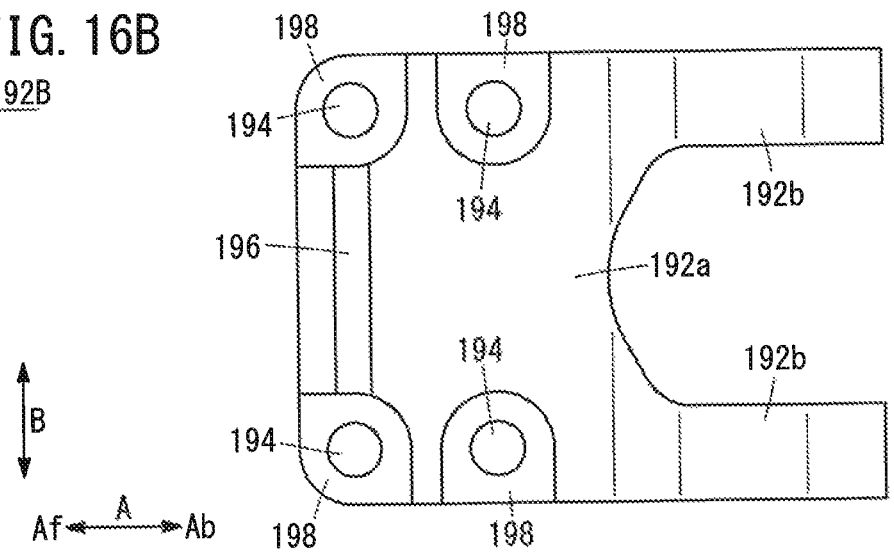
FIG. 16B is a view showing a second modification of the second bracket member.
Figure 16C:
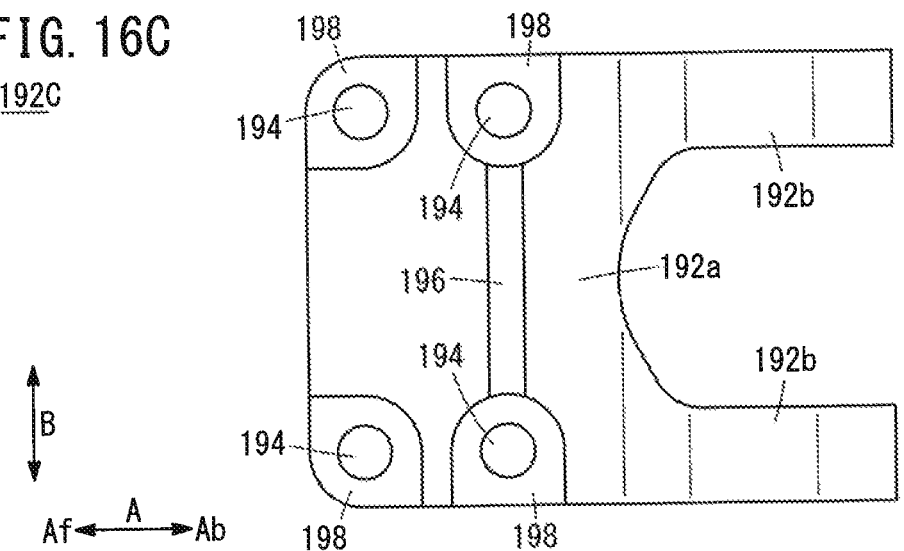
FIG. 16C is a view showing a third modification of the second bracket member.

The mount structure 190 may utilize second brackets 192A to 192C shown in FIGS. 16A to 16C instead of the second bracket 192 described above.

The second bracket 192A shown in FIG. 16A has one cutout portion 196 between the bolt holes 194*a*, 194*b* formed at positions corresponding to both ends of one side of the isosceles and another cutout portion 196 between the bolt holes 194*a*, 194*c* at positions corresponding to both ends of the other side of the isosceles.

The second bracket 192B shown in FIG. 16B has bolt holes 194 at positions corresponding to respective corners of a quadrangle. Among the four bolt holes 194, the cutout portion 196 is formed between two bolt holes 194 positioned on the front side of the vehicle (the direction of arrow Af).

The second bracket 192C shown in FIG. 16C has bolt holes 194 at positions corresponding to respective corners of a quadrangle. Among the four bolt holes 194, the cutout portion 196 is formed between two bolt holes 194 positioned on the rear side of the vehicle (the direction of arrow Ab).

What is claimed is:

1. A mount structure for fixing a fuel cell stack to a first installation member and a second installation member that are provided as separate members, the fuel cell stack including a plurality of fuel cells for generating electrical energy by electrochemical reactions of a fuel gas and an oxygen-containing gas, the fuel cells being stacked together, the mount structure comprising:
- a first bracket member configured to support the fuel cell stack and fix the fuel cell stack to the first installation member; and
- a second bracket member configured to support the fuel cell stack and fix the fuel cell stack to the second installation member,
- wherein the second bracket member has a plate portion configured to be fixed to a lower surface of the fuel cell stack by a plurality of bolts, and
- wherein the plate portion has a plurality of bolt holes through which the plurality of bolts are inserted, and in the plate portion, on a side opposite to a side configured to contact the lower surface of the fuel cell stack, each of the plurality of bolt holes has a depression extending therearound and configured such that a thickness of the plate portion at the depressions is less than a thickness of the plate portion at other parts thereof,
- and wherein a cutout portion is formed in the plate portion and extends straight between two of the plurality of bolt holes adjacent to each other along a direction in which said two of the plurality of bolt holes are separated from each other, and
- both ends of the cutout portion, respectively, are connected to the depressions surrounding said two of the plurality of bolt holes.

2. The mount structure according to claim 1, wherein the cutout portion is configured as a groove.

3. The mount structure according to claim 1, wherein
the cutout portion is arranged along a straight line connecting centers of the plurality of bolt holes adjacent to each other, as viewed from a thickness direction of the plate portion.

4. The mount structure according to claim 1, wherein the plurality of bolt holes are arranged at positions corresponding to respective vertices of an isosceles triangle, and
the cutout portion is formed at a position corresponding to a base of the isosceles triangle.

5. The mount structure according to claim 1, wherein the second bracket member further comprises a pair of legs extending downwardly from the plate portion and spaced apart from one another, each of the legs having a hole formed respectively therein for receiving a shaft portion of a bolt therethrough, the holes being coaxial and aligned with one another.

* * * * *